(12) United States Patent
Jung et al.

(10) Patent No.: US 7,636,284 B2
(45) Date of Patent: Dec. 22, 2009

(54) METHOD FOR COMPENSATING WRITING POWER IN OPTICAL DISC DEVICE

(75) Inventors: Man Young Jung, Osan-si (KR); Seung Ho Yoo, Yongin-si (KR)

(73) Assignee: LG Electronics Inc., Seoul (KR)

( * ) Notice: Subject to any disclaimer, the term of this patent is extended or adjusted under 35 U.S.C. 154(b) by 611 days.

(21) Appl. No.: 11/335,820

(22) Filed: Jan. 20, 2006

(65) Prior Publication Data

US 2006/0193223 A1 Aug. 31, 2006

(30) Foreign Application Priority Data

Jan. 21, 2005 (KR) .................... 10-2005-0005880

(51) Int. Cl.
G11B 7/125 (2006.01)
(52) U.S. Cl. .................... 369/47.53; 369/53.26
(58) Field of Classification Search .............. 369/47.5, 369/47.51, 47.53, 53.26
See application file for complete search history.

(56) References Cited

U.S. PATENT DOCUMENTS

| | | | | |
|---|---|---|---|---|
| 6,418,102 | B1* | 7/2002 | Suga | 369/47.53 |
| 2001/0007546 | A1* | 7/2001 | Lee et al. | 369/47.53 |
| 2002/0044507 | A1* | 4/2002 | Hagiwara et al. | 369/47.4 |
| 2002/0136123 | A1* | 9/2002 | Ogawa | 369/47.53 |
| 2003/0151994 | A1* | 8/2003 | Tasaka et al. | 369/47.53 |
| 2003/0156513 | A1* | 8/2003 | Tseng et al. | 369/47.53 |
| 2004/0136303 | A1* | 7/2004 | Watanabe et al. | 369/53.36 |
| 2004/0246836 | A1* | 12/2004 | Choi | 369/47.5 |
| 2005/0018549 | A1* | 1/2005 | Hsiao | 369/27.01 |
| 2005/0213452 | A1* | 9/2005 | Hirose et al. | 369/47.53 |

FOREIGN PATENT DOCUMENTS

| | | |
|---|---|---|
| CN | 1367485 | 9/2002 |
| KR | 10-2003-0073234 A | 9/2003 |
| KR | 10-2004-0082241 A | 9/2004 |

OTHER PUBLICATIONS

Korean Office Action dated Jul. 11, 2006.
Chinese Office Action dated May 11, 2007.

* cited by examiner

*Primary Examiner*—Wayne R Young
*Assistant Examiner*—Thomas D Alunkal
(74) *Attorney, Agent, or Firm*—KED & Associates, LLP

(57) ABSTRACT

Embodiments of methods and apparatus for compensating writing power in an optical disc device can compensate selected (e.g., OPC) writing power. When a writing operation is temporarily suspended (e.g., buffer under-run) during the writing operation, writing power is compensated in real time on the basis of the β value detected from read RF signals for most recently recorded data and comparisons to selected writing power (e.g., optimum β value stored therein through OPC).

19 Claims, 3 Drawing Sheets

METHOD FOR COMPENSATING WRITING POWER IN OPTICAL DISC DEVICE

BACKGROUND OF THE INVENTION

1. Field of the Invention

The present invention relates to a method for compensating writing power in an optical disc device.

2. Background of the Related Art

Generally, an optical disc device detects optimum writing power through optimum power calibration (OPC), and performs a recording operation based on the detected optimum writing power. An OPC for a recordable optical disc (for example, a DVD-R) is described below.

First, a predetermined amount of test data is recorded in a test area of the optical disc. For example, regarding the recordable optical disc (DVD-R), the test data is recorded in 1ECC block (16 sectors) each time when performing OPCs. Here, as shown in FIG. 1, with reference to writing power (hereafter Pref) corresponding to target $\beta$ value, $\beta$target, which is defined or predetermined by the manufacturer of the optical disc, the test data are recorded while writing power is changed on the basis of a predetermined amount (for example, Pref±0.6 mW).

After recording of the test data is completed, the test data are sequentially read out, and a $\beta$ value is detected from the played RF signal for the readout test. The $\beta$ value, detected through asymmetry of the played RF signal, is proportional to writing power.

After detection of the $\beta$ value is completed, on the basis of the relation between each writing power, and the detected $\beta$ value corresponding to the writing power and the target $\beta$ value, $\beta$target, optimum writing power Popt is detected. After that, the detected optimum writing power is used when a writing operation is requested.

However, since temperature variation occurs around the optical pick-up, and each disc has individual disc characteristics such as tilt components, and individual optical characteristics, etc., writing operations cannot be implemented resulting in the best writing quality using only the detected optimum writing power. To compensate optimum writing power, the prior art method controls writing power in real time through ROPC operation (an operation that compensates writing power according to light amount based on the monitoring of a light amount reflected from the disc while performing a writing operation). From test results, however, the ROPC operation can only slightly enhance writing quality.

As described above, the prior art methods and apparatus for compensating writing power in an optical disc have various disadvantages. For example, the prior art method has disadvantages in that additional parts are required, such as a thermistor and an ADC, to compensate writing power according to the temperature variation. Accordingly, the size of the device is enlarged and the cost is increased.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a method and apparatus for obtaining writing power that can solve at least the above problems and/or disadvantages and to provide at least the advantages described hereinafter.

Another object of the invention is to provide a method and apparatus for obtaining optimum writing power regardless of temperature variation around an optical pick-up, disc characteristics, and optical pick-up characteristics.

Another object of the invention is to provide a method and apparatus for compensating writing power in an optical disc based on signal characteristics for current recording data.

Another object of the invention is to provide a method and apparatus for compensating writing power based on signal characteristics for most recently recorded data where a recording operation is instantly suspended.

Another object of the invention is to provide a method and apparatus for compensating writing power based on signal characteristics for most recently recorded data in a pause state where a recording operation is instantly suspended.

In accordance with an aspect of the invention, the above and other objects can be accomplished in a whole or in part by a method for compensating writing power in an optical device that includes selecting a writing power and a writing signal characteristic corresponding to the selected writing power, performing a writing operation using the selected writing power, detecting a writing signal characteristic for previously recorded data while performing the writing operation, and comparing the detected writing signal characteristic with the writing signal characteristic corresponding to the selected writing power and compensating the writing power for a remaining portion of the writing operation.

In accordance with another aspect of the present invention, there is provided a method for compensating writing power in an optical device that includes detecting difference of writing signal characteristics corresponding to target writing power and current writing power and compensating the current writing power by a variation of writing power corresponding to the difference of the detected writing signal characteristics.

In accordance with another aspect of the present invention, there is provided an apparatus for compensating writing power in an optical device that includes an optical driver configured to output signals for a writing operation, an optical pickup unit coupled to the optical driver and configured to perform a writing operation using a selected writing power, a memory configured to store data for a plurality of writing power levels and corresponding writing signal characteristics and a controller configured to detect difference of writing signal characteristics corresponding to a target writing power and a current writing power and compensate the current writing power by a variation of writing power corresponding to the difference of the detected writing signal characteristics.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
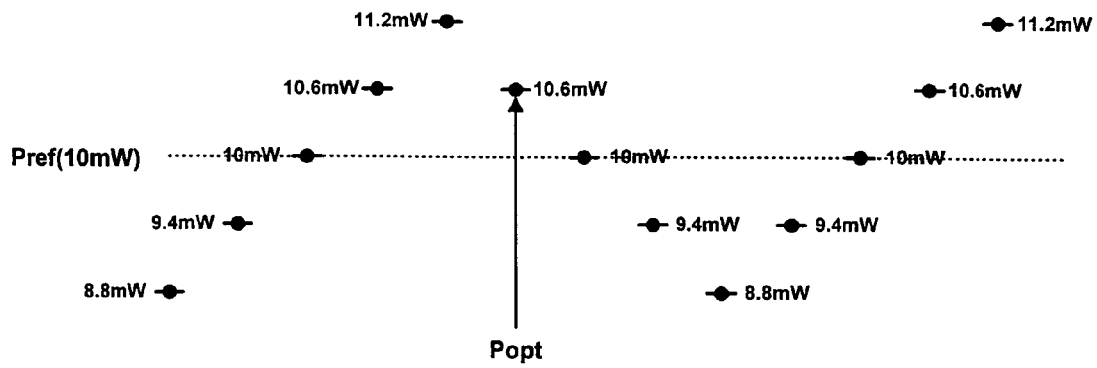
FIG. 1 is a diagram that shows exemplary variation of writing power when performing optimum power calibration (OPC)
Figure 2:
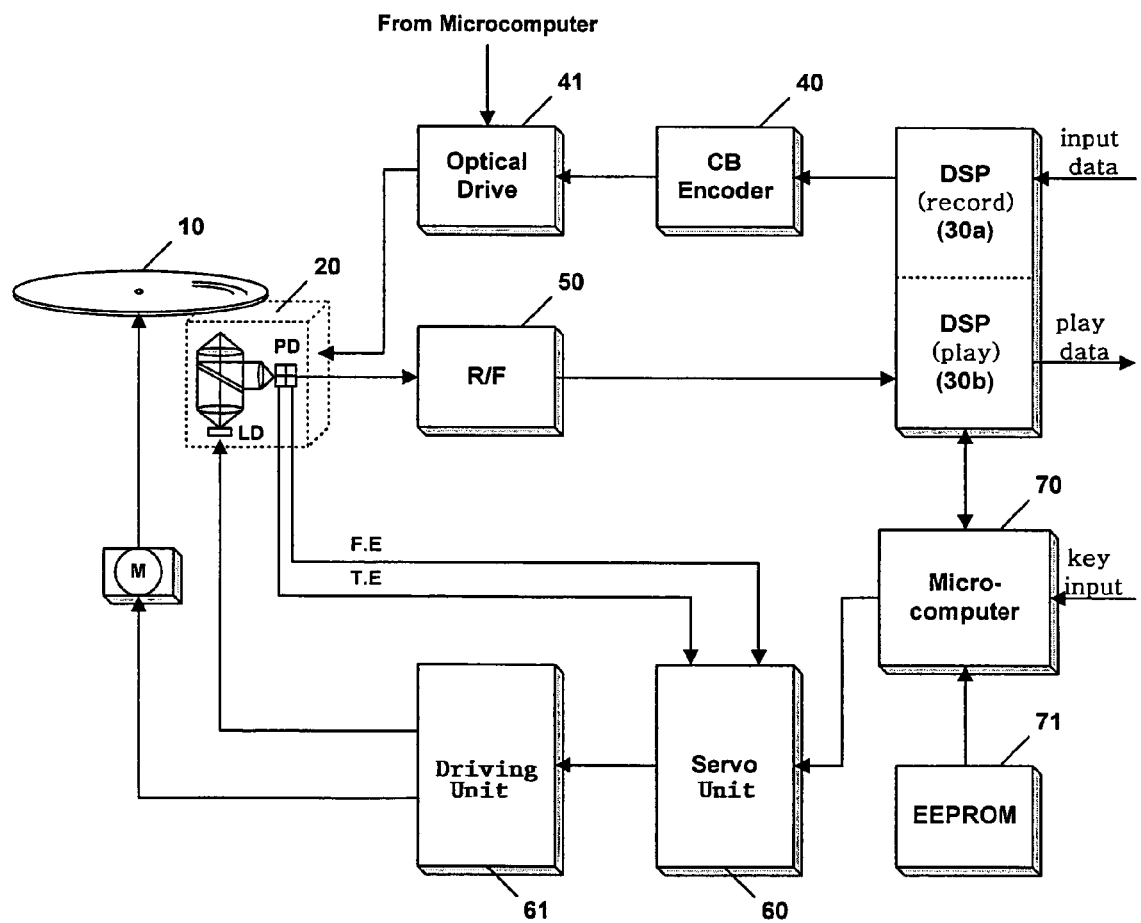
FIG. 2 is a schematic block diagram illustrating an optical disc device according to an embodiment of the present invention.

FIG. 2 is a schematic block diagram illustrating an optical disc device for compensating writing power according to an embodiment of the present invention. The optical disc device shown in FIG. 2 can perform embodiments of methods of compensating writing power according to the invention. However, the present invention is not intended to be so limited.

The optical disc device can include a digital record signal processor 30a for adding error correction codes (ECCs), etc., to inputted digital data to convert a record format, a channel bit (CB) encoder 40 for reconverting data, which are converted to the record format, to bit streams, an optical drive 41 for outputting light amount driving signals according to the inputted signals and an optical pick-up 20 for recording signals in an optical disc 10 according to the light amount driving signals or detecting recording signals from the recording surface of the optical disc. The optical disc device can further include an R/F unit 50 for filtering and rectifying the signals detected from the optical pick-up 20 to output binary signals, a driving unit 61 for driving a sled motor to move the optical pick-up 20 and a spindle motor to rotate the optical disc 10, a servo unit 60 for controlling operations of the driving unit 61 based on tracking error signal, T.E, and focus error signal, F.E., of the optical pick-up 20, and rotation speed of the optical disc 10, a digital play signal processor 30b for restoring the binary signals to the original data using its own clock phase-synchronized to the binary signal, a memory 71 and a microcomputer 70.

The memory 71 can associate optimum writing power (Popt) detected through an OPC, an optimum β value (βopt) corresponding to the optimum writing power Popt, each writing power used for optimum power calibrations (OPCs), and each β value corresponding to each writing power with each other and storing the same. For example, the memory 71 (e.g., an EEPROM) can store these power values in a table fashion.

The microcomputer 70 can control play and record operations of the optical disc 10 inserted therein. The microcomputer 70 can perform a record power compensation operation when a temporary recording suspended state, or a pause state, occurs according to buffer under-run.

Figure 3:
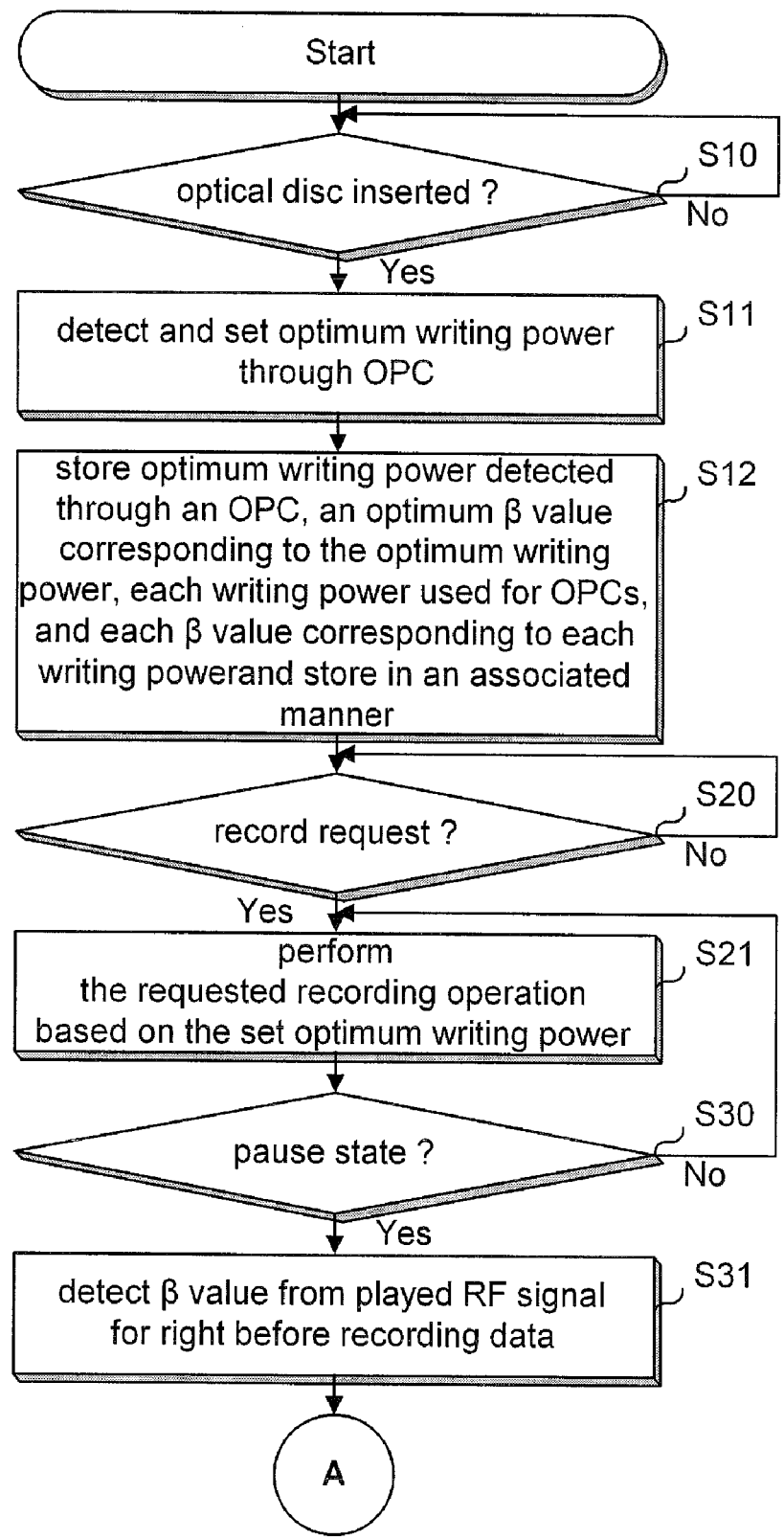
FIG. 3 and FIG. 4 are flowcharts that show a method for compensating writing power in an optical disc device according to an embodiment of the present invention.
Figure 4:
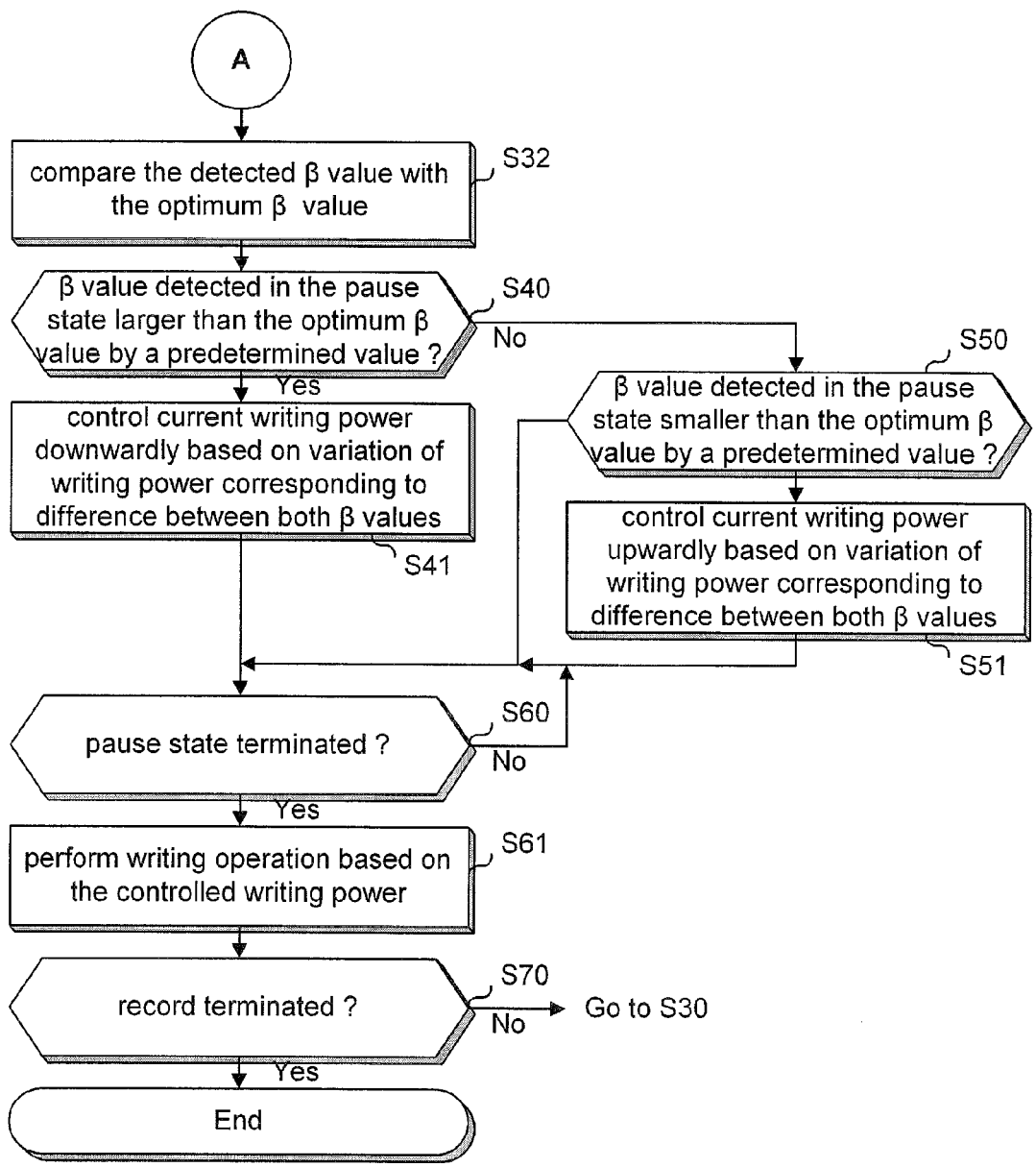

FIG. 3 and FIG. 4 are a flowchart describing a method for compensating writing power in an optical disc device according to an embodiment of the present invention. The embodiment of the method for compensating writing power shown in FIG. 3 and FIG. 4 can be applied to and will be described using the optical disc device shown in FIG. 2. However, the invention is not intended to be so limited.

As shown in FIG. 3, when the recordable optical disc 10 (for example, a DVD-R) is inserted, the microcomputer 70 can perform an OPC in a test area of the optical disc 10 (block S10). Since the OPC has been described above, its detailed description will be omitted here.

The microcomputer 70 can detect and set optimum writing power Popt through the OPC (block S11). However, the invention is not intended to be so limited.

In one optimum writing power (Popt) detected through the OPC, an optimum β value (βopt) corresponding to the optimum writing power Popt, each writing power used for OPCs, and each β value corresponding to each writing power are associated with each other and can be stored in a memory 71 (e.g., in a table) (block S12). The microcomputer 70 can detect variation of writing power according to variation of β value from each writing power stored in the memory and each β value corresponding to each writing power.

A recording operation can be requested (block S20). The microcomputer 70 can perform the requested recording operation based on the set optimum writing power (block S21).

According to an embodiment of the invention, the microcomputer 70 can perform writing power compensation operations within the requested recording operation. For example, the microcomputer 70 can perform a writing power compensation operation every time a recording operation is temporarily suspended (e.g., a pause state) while the writing operations are performed (e.g., because of the buffer under-run). However, the invention is not intended to be limited to every time the recording operation is suspended. For example, a writing power compensation operation can occur periodically, every fifth recording operation suspension or the like.

An exemplary buffer under-run will now be described. Generally, the optical disc device, for example, a DVD recorder, can record high quality video data and high quality audio data in an optical disc 10, such as a recordable DVD. Such an optical disc device can compress and encode audio and video data streams to be recorded in the optical disc 10 to comply with MPEG format, and buffer them in a buffer, such as an SRAM.

After that, the optical disc device can perform a series of data recording operations, such as reading out the buffered data from the buffer and recording the readout data in the optical disc 10. Since the speed of bit stream is slow compared with the recording speed (e.g., X times recording speed) of a general optical disc device (e.g., a device designed so that recording speed is fast for various objects, such as trick play, etc.), a buffer under-run can periodically occur while the recording operations are performed.

When such a buffer under-run occurs, the optical disc device can maintain a pause state where a recording operation is temporarily suspended to reduce or prevent writing failure because of the buffer under-run. In the pause state, generally the optical disc device can perform a back track jump operation such that the optical pick-up 20, moving to the outer direction of the disc along the data recording track that is spiral, can be moved to the last data writing position again. However, the invention is not intended to be so limited.

As shown in FIG. 3, when the optical pick-up is in the pause state during the writing operation (block S30), the microcomputer 70 can perform a test read operation for most recently recorded data to detect β value from read RF signal for most recently recorded data, which is outputted from the R/F unit 50 (block S31). In the description of the embodiment shown in FIGS. 3-4, an example optimum β value (βopt) corresponding to the optimum writing power Popt detected through the OPC is assumed to be 2%, and the example β value detected in the pause state is assumed to be 5%.

The microcomputer 70 can compare the detected β value (e.g., 5%) with the optimum β value, βopt, (e.g., 2%) (block S32), to determine whether writing power should be compensated on the basis of difference therebetween. The microcomputer 70 can detect a difference between the two β values and can perform a writing power compensation operation based on the difference or if the difference is larger than a predetermined value.

As shown in FIG. 4, as an example regarding compensation of the writing power, if the difference between the two β values is more than a predetermined value and a β value detected in the pause state is larger than the optimum β value (block S40), the microcomputer 70 can determine that the writing power is set too high and then can control a current writing power to be decreased and compensate the power (block S41). If the β value detected in the pause state is smaller than the optimum β value (e.g., by the predetermined value) (block S50), the microcomputer 70 can determine that the writing power is set too small, and control the current writing power to be increased to compensate the power (block S51).

When the writing power is compensated, the microcomputer 70 can detect difference between the two β values, or variation of the writing power (for example, 0.6 mW) corresponding to variation of β value (e.g., 3%) from the memory 71, and then control current writing power downwardly or upwardly to be compensated using variation of the detected writing power as a compensation value. Accordingly, after the writing power is controlled, when the pause state is terminated and then the writing operation is resumed (block S60), the microcomputer 70 can perform a writing operation based on the controlled writing power (e.g., compensated) (block S61).

On the other hand, if the difference between the two β values is less than the predetermined value, the microcomputer 70 can perform the next writing operation (e.g., continue the requested recording operation) using currently set writing power (block S61). In this case, the currently set writing power is not compensated.

Also, the microcomputer 70 can repeatedly perform a writing operation till all the writing operations are terminated (block S70). Further, a determination operation as to whether writing power is compensated in the suspended state, and a compensation operation based on the determination can be performed until all writing operations are terminated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of methods and apparatus for compensating writing power (e.g., OPC writing power) according to the invention have various advantages. For example, one embodiment of a method for compensating writing power in an optical disc device according to the invention can compensate writing power in real time. The writing power can be compensated on the basis of the play RF signals for most recently recorded data when a writing operation is temporarily suspended (e.g., a buffer under-run). Accordingly, the writing power can be effectively compensated without additional parts, such as a thermostat, relative to the compensation method using a ROPC. In addition, embodiments can increase or enhance writing quality.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for compensating writing power in an optical device, comprising:
    selecting a writing power and a writing signal characteristic corresponding to the selected writing power;
    performing a writing operation using the selected writing power;
    detecting a writing signal characteristic for previously recorded data while performing the writing operation;
    determining whether the detected writing signal characteristic is larger, by a prescribed value, than the writing signal characteristic corresponding to the selected writing power; and
    compensating the writing power for a remaining portion of the writing operation when the detected writing signal characteristic is larger than the corresponding writing signal characteristic by the prescribed value, wherein the compensating includes reducing the writing power based on a difference between the detected writing signal characteristic and the writing signal characteristic corresponding to the selected writing power.

2. The method of claim 1, wherein the selected writing power is detected through an optimum power calibration operation.

3. The method of claim 1, wherein the detecting a writing signal characteristic for previously recorded data is performed in a state where the writing operation is temporarily suspended.

4. The method of claim 1, wherein the detecting a writing signal characteristic for previously recorded data comprises performing a back track jump.

5. The method of claim 1, wherein the writing signal characteristic is detected when signals recorded by the writing power are reproduced.

6. The method of claim 4, the writing signal characteristic shows asymmetry of RF signals and is read out by play power.

7. The method of claim 1, wherein the detecting a writing signal characteristic for previously recorded data is performed during a pause operation in the writing operation.

8. The method of claim 7, wherein the pause operation in the writing operation is caused by a buffer underrun condition.

9. A method for compensating writing power in an optical device, comprising:
    detecting difference of writing signal characteristics corresponding to target writing power and current writing power; and
    compensating the current writing power by a variation of writing power corresponding to the difference of the detected writing signal characteristics, wherein the compensating includes reducing the current writing power based on the difference when the difference is greater than a prescribed value, and increasing the current writing power based on the difference when the difference is less than the prescribed value.

10. The method of claim 9, wherein the variation of writing power is calculated based on a ratio of variation of detected writing signal characteristics.

11. The method of claim 9, wherein the writing signal characteristic is detected when signals recorded by the writing power are readout by play power.

12. The method of claim 11, wherein the writing signal characteristic shows asymmetry of RF signals.

13. The method of claim 9, wherein the target writing power is detected through an optimum power calibration operation, wherein the compensating the current writing power is performed in a state where the current writing operation is temporarily suspended.

14. The method of claim 13, wherein the detecting a writing signal characteristic for the current writing operation comprises performing a back track jump for previously recorded data of the current writing operation.

15. The method of claim 9, wherein the detecting a writing signal characteristic for previously recorded data is performed during a pause operation in the writing operation, and wherein the pause operation in the writing operation is caused by a buffer underrun condition.

16. The method of claim 9, wherein the compensating the current writing power is performed in a state where the current writing operation is temporarily suspended.

17. An apparatus for compensating writing power in an optical device, comprising:

an optical driver configured to output signals for a writing operation;

an optical pickup unit coupled to the optical driver and configured to perform a writing operation using a selected writing power;

a memory configured to store data for a plurality of writing power levels and corresponding writing signal characteristics; and a controller configured to detect difference of writing signal characteristics corresponding to a target writing power and a current writing power and compensate the current writing power by a variation of writing power corresponding to the difference of the detected writing signal characteristics, wherein the controller compensates the current writing power by reducing the current writing power based on the detected difference when the detected difference is greater than a prescribed value, and the controller compensates the current writing power by increasing the current writing power based on the detected difference when the detected difference is less than the prescribed value.

18. The apparatus of claim 17, wherein the compensation is performed in a state where the current writing operation is suspended.

19. The apparatus of claim 17, wherein the compensation is performed for a next portion of the current writing operation.

* * * * *